3,825,473
PRODUCTION OF CEPHALOSPORIN C
Francesco Gargiuolo, Bologna, Italy, assignor to Alfa Farmaceutici, S.p.A., Bologna, Italy
No Drawing. Filed Aug. 4, 1972, Ser. No. 277,881
Claims priority, application Great Britain, Aug. 13, 1971, 38,149/71
Int. Cl. C12d 9/22
U.S. Cl. 195—36 R      18 Claims

ABSTRACT OF THE DISCLOSURE

Cephalosporin C, which is useful as a starting material in the preparation of the semi-synthetic cephalosporin antibiotics, is produced by the aerobic cultivation of a novel microorganism, Cephalosporium Sp. strain F. 12 (ATCC 20339). The cultivation is performed in a nutrient medium containing assimilable sources of carbon and nitrogen, one or more inorganic salts, and an organic source of sulfur. High yields of Cephalosporin C are obtained, with reduced yields of the undesirable by-product Cephalosporin N, by comparison with previously used Cephalosporium strains.

BACKGROUND OF THE INVENTION

This invention is concerned with improvements in and relating to the production of Cephalosporin C and, more particularly, is concerned with the production of Cephalosporin C using a novel microorganism, namely Cephalosporium Sp. strain F. 12.

Cephalosporin C is a valuable antibiotic material in that it is active against both Gram positive and Gram negative bacteria and is both acid stable and penicillinase resistant. Cephalosporin C has been fully described in the literature, for example in a paper entitled "The Cephalosporins" (E. P. Abraham, Pharmacological Reviews, Vol. 14, 1962, pages 477–500). In practice, Cephalosporin C is not used per se as an antibiotic in the treatment of infectious diseases caused by Gram positive or Gram negative bacteria since its activity is relatively low; thus its in vitro activity against a number of Gram positive bacteria is only 0.1% of that of benzylpenicillin. However, Cephalosporin C is used as a starting material in the preparation of a large number of so-called "semi-synthetic Cephalosporins," some of which have found considerable use as wide-spectrum antimicrobials. Thus, Cephalosporin C is an important product in itself.

Cephalosporin C is prepared by cultivating various Cephalosporium species under suitable conditions and, in addition to Cephalosporin C, other antibiotic materials, namely Cephalosporin N and Cephalosporin P, are also produced. Cephalosporin P is the term used to refer to a family of steroidal compounds having some antibacterial activity against Gram positive bacteria, and Cephalosporin N (Penicillin N) is a penicillanic compound having an alpha-aminoadipyl side chain.

The physical properties of Cephalosporin C and Cephalosporin N are closely similar so that it is difficult to purify Cephalosporin C by separating it from Cephalosporin N. It is, therefore, clearly desirable to reduce the amount of Cephalosporin N formed during the cultivation of the microorganism, for example, by selecting the nutrients in the culture medium so that the Cephalosporin C may be produced in as high a relative quantity with respect to the other antibiotic materials, as possible.

However, the known microorganisms used in the production of Cephalosporin C, for example, the original Brotzu strain, produce Cephalosporin N in relatively large amounts and the general rate of production of the desired end product, Cephalosporin C, is often low. Thus, for example, there is described in U.S. Pat. No. 3,032,155, a process for the production of Cephalosporin C using a mutant strain of Cephalosporium Sp. ATCC 14553, but under the best fermentation conditions disclosed the yield of Cephalosporin C is only 500 micrograms per millilitre.

SUMMARY OF THE INVENTION

It has now been found, in accordance with the present invention, that Cephalosporin C can be produced by the cultivation of a novel microorganism, namely Cephalosporium Sp. strain F. 12, and that this microorganism is capable of producing Cephalosporin C in high yields whilst, at the same time, giving rise to a reduced yield of Cephalosporin N.

Broadly, therefore, the present invention provides a process for the production of Cephalosporin C, which comprises cultivating the microorganism Cephalosporium Sp. strain F. 12 under aerobic conditions in a nutrient medium therefor containing assimilable sources of carbon and nitrogen, one or more inorganic salts, and an organic source of sulfur.

Cephalosporium Sp. strain F. 12 is a mutant of Cephalosporium Sp. ATCC 11550 and has been deposited in the American Type Culture Collection under the accession number ATCC 20339, and in the Centralbureau voor Schimmelcultures, Baarn, Netherlands, under accession number CBS 535.71.

Cephalosporium Sp. strain F. 12 has the following general characteristics:

When grown on solid media, e.g. Sabouraud, oat-agar, Bennet, potato-agar and Waksman media, the microorganism shows shallow, shiny and roundish colonies having continuous or slightly irregular edges, with colorless or yellowish vegetative mycelia. The color, when present, can diffuse into the medium. No aerial growth, conidia or conidiophores are formed. When grown on some media, e.g. Bennet medium, the mycelia show terminal or intercalary chlamydospores. The surface of the colony shows many radial wrinkles which may or may not be branched. The hyphae are septate, generally branched, and sometimes show little drops of fat. The strain does not use nitrates as a nitrogen source in the growth medium.

DESCRIPTION OF THE PREFERRED EMBODIMENTS

The process in accordance with the invention is conveniently carried out in submerged aerobic culture, preferably at a temperature of from 20 to 30° C.

The assimilable source of carbon in the nutrient medium for the microorganism is conveniently a carbohydrate, which may be a monosaccharide, disaccharide or polysaccharide. Examples of suitable carbohydrates include glucose, sucrose, galactose, lactose, fructose, mannitol, sorbitol, dextrin, soluble and insoluble starches, and beet molasses. The carbohydrates in the nutrient medium are conveniently in the form of a mixture of monosaccharides, disaccharides and polysaccharides; and the carbohydrate concentration in the nutrient medium is suitably from 2% to 10% by weight.

The nutrient medium preferably also contains a glyceride or hydrolysed glyceride such as, for example, olive oil, peanut oil, sunflower oil, coconut oil, palm oil, linseed oil, maize oil, lard oil, and saturated and unsaturated fatty acids and esters (or partial esters) thereof with monohydric and polyhydric lower alcohols. Particularly preferred glycerides or hydrolysates thereof used in accordance with the invention are lard oil, sunflower oil, maize oil, oleic acid, ricinoleic acid, linolic acid, linoleic acid and arachidonic acid. Particularly preferred esters of unsaturated fatty acids which may be used in accordance with the invention are methyl linoleate, glycerol mono-oleate, polyethylene glycol mono-oleate and polyethylene glycol di-oleate. The glyceride or hydrolysis product thereof is preferably present in the nutrient medium in an amount of from 1% to 8% by weight. It is believed that such products, especially the esters of the unsaturated fatty acids, serve to inhibit the production of by-products and to enhance the production of Cephalosporin C.

The nutrient medium used in the process of the invention also contains an organic nitrogen source, which is preferably present in an amount to furnish from 0.01% to 0.1% of available nitrogen based on the weight of the medium. The organic nitrogen source is conveniently a vegetable or animal protein, or a degradation or hydrolysis product thereof, such as a polypeptide, peptone, tryptone, or aminoacid. Preferred organic nitrogen sources include cottonseed meal, fish meal, meat meal, maize meal, corn meal, leguminous meals (e.g. soybean meal, dwarf-pea meal or peanut meal), yeast extract, meat extracts, and by-products from the alcohol fermentation industry and degradation products of maize.

The nutrient medium used in the process of the invention also contains at least one inorganic salt leading to the improved biosynthesis of Cephalosporin C such as, for example, calcium carbonate, borax, ammonium acetate, ammonium sulfate or an alkali metal phosphate. Such inorganic salts are preferably present in the nutrient medium in an amount of from 0.5% to 1.5% by weight.

As stated above, the nutrient medium contains an organic source of sulfur, especially methionine—which is preferably present in the medium at a concentration of from 0.5% to 2.5% by weight. Other sulfur-containing organic compounds may be used as the sulfur source, for example compounds having the formula:

$$R^1\text{---}X\text{---}CH(R^2)\text{---}CO\text{---}Y\text{---}R^3$$

in which $R^1$, $R^2$ and $R^3$ are the same or different and each is a hydrogen atom or an alkyl group containing from 1 to 5 carbon atoms, and one of X and Y is a sulfur atom and the other of X and Y is an oxygen atom or sulfur atom. Examples of such compounds include thioglycolic acid, thioacetic acid, methyl thioglycolate, and methyl thioacetate. Such sulfur sources are suitably present in the culture medium in an amount of from 0.05% to 1% by weight. It is noteworthy that the culture of *Cephalosporium Sp.* strain F. 12 requires the presence of an *organic* source of sulfur, whereas other *Cephalosporium* species may be cultivated in the presence of an *inorganic* of sulfur. Indeed, some organic sulfur sources, such as thioglycolic acid, are toxic to other *Cephalosporium* species but are not toxic to *Cephalosporium Sp.* strain F. 12.

The process in accordance with the invention is suitably carried out as follows.

Firstly, the microorganism is grown on slants containing a growth medium, for a period of from 10 to 15 days, at a temperature of from 28° to 30° C. The growth myclelia are then washed with water, and the solution thus obtained is used as an inoculum for a seed medium. The seed medium is then maintained under aerobic conditions, with agitation, at a temperature of from 25° to 30° C. for 48–96 hours. The resulting seed medium is used to inoculate the final growth medium, and is conveniently introduced into the final growth medium in an amount of about 5% by weight of the final growth medium.

The culture of the inoculated final growth medium, i.e. the process in accordance with the invention, is preferably carried out for a period of from 96 to 130 hours, at a temperature of from 20° to 30° C., preferably from 22° to 28° C. The yield of Cephalosporin C obtained may be determined either spectrophotometrically (Claridge, Vaughan, Kressel and Gourevitch, "Antimicrobial Agents and Chemotherapy," 1969, page 131) or microbiologically.

The process in accordance with the invention may be carried out on a continuous basis, using continuous culture apparatus provided with means for feeding sterile nutrient medium to one or more growth vessels, and with means for harvesting the cell suspension automatically. At intervals, a portion of the fermentation broth is removed, and a corresponding volume of fresh medium is added to the culture. Typically, this may be done after an inttial culture time of 75 to 110 hours. The fresh nutrient may be introduced into the system by means of a continuously operating metering pump, and the rate of effluent flow is so regulated as to achieve a constant working volume and population density in the culture apparatus. The dilution rate of the continuous culture is suitably maintained at from 0.2 to 0.8, preferably 0.4 to 0.5, volume changes per day.

The Cephalosporin C produced in accordance with the invention may be isolated from the culture broth in accordance with conventional techniques, and the resulting crude fermentation mixture purified, for example by filtration, carbon clarification, adsorption on an ion exchange resin, elution with an aqueous base such as pyridine, and evaporation of the solvent to give the crystalline material.

In order that the invention may be well understood, the following Examples are given by way of illustration only. In the Examples, all parts are by weight unless otherwise stated.

Example 1

The following nutrient medium was introduced into a 27 litre stirred, aerated fermentation vessel made of stainless steel.

```
                                                    Parts
Peanut meal ---------------------------------------- 60
Starch --------------------------------------------- 40
Methyl oleate --------------------------------------- 8
Lard oil ------------------------------------------- 60
Sucrose -------------------------------------------- 5
D-glucose ------------------------------------------ 7
CaCO3 --------------------------------------------- 10
Borax --------------------------------------------- 0.5
DL-Methionine -------------------------------------- 15
Water ad 1000 parts
```

The pH of the medium was adjusted to give a final value of 7.2 to 7.8 and the medium was sterilized with steam at 120° C. for 25–30 minutes.

The fermentation vessel was then inoculated with 5–10% by volume of a growth of *Cephalosporium Sp.* strain F. 12 prepared by inoculating spores of the microorganism into the following medium:

```
                                                  Percent
Lard oil ------------------------------------------- 0.1
Corn Steep liquor ---------------------------------- 2.0
NH4 acetate ---------------------------------------- 0.6
Sucrose -------------------------------------------- 2.0
``` and incubating the inoculated medium in an aerated flask for 72 hours at 24–28° C.

The inoculated fermentation vessel containing the nutrient medium was then kept at 22–28° C. for 130 hours and during this period the aeration level was maintained at a flow rate at 1 litre/litre/minute with stirring at 300–450 r.p.m. The resultant culture contained 4,500–5,000 micrograms per ml. of Cephalosporin C (average value).

Example 2

The growth from a 1 inch slant of a culture of *Cephalosporium* Sp. Strain F. 12 was suspended in 5 ml. of sterile water and was used to inoculate 500 ml. of a seed medium having the following composition:

```
                                                   Parts
Corn steep liquor ---------------------------------- 25
Sucrose -------------------------------------------- 20
Ammonium acetate ---------------------------------- 4.5
Lard oil ------------------------------------------ 0.5
Water to 1,000 parts.
```

The inoculated medium was incubated at 24–28° C. on a rotating shaker at 220 r.p.m. for 72 hours, in the presence of different sulfur compounds in amounts of one equivalent of sulfur (0.01 mole for 1,000 ml.). Sixty ml. of each of four following media were then inoculated from the resulting vegetative medium, and kept at 22 to 28° C. for 114 hours while being agitated on a rotating shaker at 250 r.p.m., with yields of Cephalosporin C (in micrograms per ml. of harvested medium) as shown:

|  | Parts, medium— | | | |
|---|---|---|---|---|
|  | 1 | 2 | 3 | 4 |
| Peanut meal | 60 | 60 | 60 | 60 |
| Starch | 40 | 40 | 40 | 40 |
| Methyl oleate | 6 | 6 | 6 | 6 |
| Lard oil | 60 | 60 | 60 | 60 |
| Sucrose | 5 | 5 | 5 | 5 |
| Cerelose | 7 | 7 | 7 | 7 |
| CaCO₃ | 10 | 10 | 10 | 10 |
| Borax | 0.5 | 0.5 | 0.5 | 0.5 |
| DL-Methionine | 1.49 | | | |
| Methyl thioglycolate | | 0.06 | | |
| Thioacetic acid | | | 0.76 | |
| Thioglycolic acid | | | | 0.92 |
| Water to | 1,000 | 1,000 | 1,000 | 1,000 |
| Cephalosporin C yield (micrograms) | 100 | 100 | 160 | 100 |

Example 3

60 ml. of the following medium were inoculated with the seed medium preparated in Example 2.

|  | Parts |
|---|---|
| Peanut meal | 60 |
| Starch | 40 |
| Methyl oleate | 6 |
| Lard oil | 60 |
| Sucrose | 5 |
| Cerelose | 7 |
| CaCO₃ | 10 |
| Borax | 0.5 |
| DL-Serine | 2 |
| Thioacetic acid | 1 |
| Water ad 1,000 parts. | |

The inoculated medium was incubated at 22–28° C. on a rotary shaker at 250 r.p.m. for 100 hours to give a broth containing 330–360 micrograms/ml. of Cephalosporin C.

Example 4

The procedure of Example 1 was repeated except that the following nutrient medium was used.

|  | Parts |
|---|---|
| Peanut meal | 50 |
| Starch | 60 |
| Methyl oleate | 25 |
| Sucrose | 5 |
| Glucose | 7 |
| Calcium carbonate | 10 |
| Borax | 0.5 |
| DL-Methionine | 15 |
| Water ad 1,000 parts. | |

The resulting culture contained 4,500–5,000 micrograms per millilitre of Cephalosporin C.

Example 5

The seed medium obtained in Example 2 was used to inoculated 60 ml. of each of the following media and each medium was then kept at 22° to 28° C. for 110 hours, while being agitated on a rotatory shaker at 250 r.p.m.

|  | Parts, Medium— | | | |
|---|---|---|---|---|
|  | 6 | 7 | 8 | 9 |
| Peanut meal | 60 | 60 | 60 | 60 |
| Starch | 40 | 40 | 40 | 40 |
| Methyl linoleate | 25 | | | |
| Glycerin monooleate | | 25 | | |
| Polyglycol monooleate | | | 25 | |
| Polyglycol dioleate | | | | 25 |
| Sucrose | 5 | 5 | 5 | 5 |
| Glucose | 7 | 7 | 7 | 7 |
| CaCO₃ | 10 | 10 | 10 | 10 |
| Borax | 0.5 | 0.5 | 0.5 | 0.5 |
| DL-methionine | 15 | 15 | 15 | 15 |
| Water to | 1,000 | 1,000 | 1,000 | 1,000 |

In each case the Cephalosporin C level attained in the medium was between 3,000 and 3,500 micrograms per millilitre.

Example 6

The following nutrient medium was introduced into a 27 litre stirred, aerated fermentation vessel made of stainless steel:

|  | Parts |
|---|---|
| Peanut meal | 60 |
| Starch | 40 |
| Methyl oleate | 25 |
| Sucrose | 5 |
| D-Glucose | 7 |
| CaCO₃ | 10 |
| Borax | 0.5 |
| DL-Methionine | 15 |
| Water ad 1,000 parts. | |

The pH of medium was adjusted to give a final value of 7.2 to 7.8, and the medium was sterilized with steam at 120° C. for 20 minutes. The fermentation medium was then inoculated with 5%–10% by volume of a growth of *Cephalosporium Sp.* F. 12, prepared by inoculating spores of microorganisms into the following medium:

|  | Parts per thousand |
|---|---|
| Lard oil | 1 |
| Corn steep | 20 |
| Ammonium acetate | 6 |
| Sucrose | 20 | and incubating the inoculated medium in an aerated flask for 72 hours at 26°–30° C.

The inoculated fermentation vessel contaiinng the nutrient medium was then kept at 22°–28° C. for 92 hours. Further culture medium was then fed to the culture vessel at the rate of 260 ml./hour, so that the dilution rate was about 0.25 volume changes per day. The temperature was maintained at 22°–24° C., the agitation at 350 r.p.m., and the aeration at 0.5–1 litre/litre/minute throughout the continuous culture process. During 15 days after the commencement of continuous operation, 93.6 litres of medium were harvested, with a Cephalosporin C concentration as shown in Table 1.

TABLE 1

| Culture time | Volume harvested (ml.) | Cephalosporin C concentration (micrograms/ml). |
|---|---|---|
| Hours: | | |
| 92 | 0 | 2,180 |
| 116 | 6,240 | 2,090 |
| 140 | 6,240 | 2,260 |
| 164 | 6,240 | 2,010 |
| 188 | 6,240 | 2,375 |
| 212 | 6,240 | 2,400 |
| 236 | 6,240 | 2,130 |
| 260 | 6,240 | 2,210 |
| 284 | 6,240 | 2,175 |
| 308 | 6,240 | 2,200 |
| 332 | 6,240 | 2,190 |
| 356 | 6,240 | 2,000 |
| 380 | 6,240 | 2,260 |
| 404 | 6,240 | 2,190 |
| 428 | 6,240 | 2,290 |
| 452 | 6,240 | 2,090 |
| Total | 93,600 | |

Example 7

Four fermentation vessels, each containing 6 litres of the nutrient medium described in Example 6, were inoculated with *Cephalosporium Sp.* F.12. The fermentation temperature was maintained at 23°±0.5° C. and the aeration at 0.5 litre/litre/minute. One fermentation vessel, labelled J–1, was used as a control. The other three fermentation vessels, J–2, J–3 and J–4, were fed after 96 hours with a fresh and sterile nutrient medium at a renewal speed of 0.0104 volumes/hour, 0.0154 volumes/hour and 0.0208 volumes/hour, respectively. The quantities harvested and concentrations of Cephalosporin C are shown in Table 2. In the column for each fermentation vessel, the first set of figures is the volume harvested (in litres) at the indicated time, and the second set is the Cephalosporin C concentration in the nutrient medium (in micrograms/millilitre) at that time.

TABLE 2

| Culture time | Fermentation vessel | | | | | | |
|---|---|---|---|---|---|---|---|
| | J–1 | | J–2 | | J–3 | | J–4 |
| Hours: | | | | | | | |
| 96 | 6 | 2,200 | 1.5 | 2,150 | 2.25 | 2,360 | 3 2,090 |
| 120 | | | 1.5 | 2,230 | 2.25 | 2,280 | 3 2,300 |
| 144 | | | 1.5 | 2,180 | 2.25 | 2,320 | 3 2,170 |
| 168 | | | 1.5 | 2,200 | 2.25 | 2,370 | 3 2,220 |
| 192 | 6 | 2,280 | 1.5 | 2,310 | 2.25 | 2,150 | 3 2,295 |
| 216 | | | 1.5 | 2,090 | 2.25 | 2,410 | 3 2,170 |
| 240 | | | 1.5 | 2,050 | 2.25 | 2,295 | 3 2,260 |
| 264 | | | 1.5 | 2,190 | 2.25 | 2,420 | 3 2,300 |
| 288 | 6 | 2,120 | 1.5 | 2,235 | 2.25 | 2,290 | 3 2,100 |
| 312 | | | 1.5 | 2,000 | 2.25 | 2,450 | 3 2,250 |
| 336 | | | 1.5 | 1,909 | 2.25 | 2,500 | 3 2,300 |
| 360 | | | 1.5 | 1,970 | 2.25 | 2,490 | 3 2,350 |
| 384 | 6 | 2,220 | 1.5 | 1,720 | 2.25 | 2,370 | 3 2,300 |
| 408 | | | 1.5 | 1,810 | 2.25 | 2,415 | 3 2,280 |
| 432 | | | 1.5 | 1,700 | 2.25 | 2,500 | 3 2,320 |
| 456 | | | 1.5 | 1,700 | 2.25 | 2,480 | 3 2,310 |
| 480 | 6 | 2,250 | 6.0 | 1,780 | 6.0 | 2,515 | 2 2,320 |

Table 3 shows the total volume harvested in 20 days of fermentation, the mean titre of Cephalosporin C, and the total quantity of Cephalosporin C produced in 20 days of fermentation in each fermentation vessel.

TABLE 3

| | Fermentation vessel | | | |
|---|---|---|---|---|
| | J–1 | J–2 | J–3 | J–4 |
| Total volume harvested (litres) | 30 | 30 | 42 | 54 |
| Mean titre (micrograms/ml.) | 2,214 | 2,012 | 2,390 | 2,250 |
| Total quantity of Cephalosporin C produced in 20 days (g.) | 66.4 | 60.4 | 100.4 | 121.5 |

I claim:

1. A process for the production of Cephalosporin C, which comprises the steps of: inoculating a culture medium containing assimilable sources of carbon and nitrogen, at least one inorganic salt and an organic source of sulfur with a culture of the microorganism *Cephalosporium Sp.* strain F.12 (ATCC 20339); cultivating the microorganism in said culture medium to produce a culture broth containing Cephalosporin C; and recovering Cephalosporin C from said culture broth.

2. A process according to claim 1, wherein the cultivation is carried out as a submerged aerobic cultivation.

3. A process according to claim 1, wherein the source of carbon in the nutrient medium is a carbohydrate.

4. A process according to claim 3, wherein the source of carbon in the nutrient medium comprises a mixture of at least one monosaccharide, at least one disaccharide, and at least one polysaccharide.

5. A process according to claim 3, wherein the nutrient medium contains from 2% to 10% by weight of the carbohydrate.

6. A process according to claim 1, wherein the nutrient medium also contains a member selected from the group consisting of glycerides and hydrolysed products thereof.

7. A process according to claim 6, wherein the nutrient medium contains an ester of an unsaturated fatty acid and a lower alcohol.

8. A process according to claim 7, wherein the said ester is a member selected from the group consisting of methyl linoleate, glycerol mono-oleate, polyethylene glycol mono-oleate and polyethylene glycol di-oleate.

9. A process according to claim 1, wherein the source of nitrogen in the nutrient medium is an organic nitrogen source present in an amount sufficient to provide from 0.01 to 0.1% by weight, based on the weight of the medium, of available nitrogen.

10. A process according to claim 9, wherein the organic nitrogen source is a member selected from the group consisting of animal and vegetable proteins, and degradation and hydrolysis products thereof.

11. A process according to claim 1, wherein the inorganic salt in the nutrient medium is a member selected from the group consisting of calcium carbonate, borax, ammonium acetate, ammonium sulfate and alkali metal phosphates.

12. A process according to claim 1, wherein the nutrient medium contains from 0.5% to 1.5% by weight of inorganic salt.

13. A process according to claim 1, wherein the organic source of sulfur is methionine.

14. A process according to claim 1, wherein the organic source of sulfur is a compound of the formula:

$$R^1-X-CH(R^2)-CO-Y-R^3$$

in which each of $R^1$, $R^2$ and $R^3$ is a member selected from the group consisting of hydrogen and alkyl groups containing from 1 to 5 carbon atoms, and one of X and Y is a sulfur atom and the other of X and Y is selected from the group consisting of oxygen and sulfur atoms.

15. A process according to claim 1, wherein the nutrient medium contains from 0.05% to 1% by weight of the organic source of sulfur.

16. A process according to claim 1, wherein the cultivation is carried out at a temperature of from 20° to 30° C.

17. A process according to claim 1, wherein the cultivation is carried out at a temperature of from 22° to 28° C.

18. A process according to claim 1, wherein the cultivation is carried out for a period of from 96 to 130 hours.

References Cited

UNITED STATES PATENTS 3,082,155  3/1963  Kelly et al. _____ 195—36 R
3,539,694  11/1970  Niss _____ 195—36 R

OTHER REFERENCES

Stauffer et al.: Developments in Industrial Microbiology, vol. 7, pp. 104–113 (1966).

ALVIN E. TANENHOLTZ, Primary Examiner

U.S. Cl. X.R.

195—100, 115